Fig. 1.

T. A. BANNING, Jr.
MULTIPLE PUNCH PRESS.
APPLICATION FILED JULY 2, 1910.

977,362.

Patented Nov. 29, 1910.

Witnesses:
J. N. Daggett
Mary A. Frost

Inventor:
Thomas A. Banning Jr.
by Banning & Banning
Attorneys.

UNITED STATES PATENT OFFICE.

THOMAS A. BANNING, JR., OF CHICAGO, ILLINOIS, ASSIGNOR TO FRANK THOMPSON, OF CHICAGO, ILLINOIS.

MULTIPLE-PUNCH PRESS.

977,362.  Specification of Letters Patent.  Patented Nov. 29, 1910.

Application filed July 2, 1910. Serial No. 570,160.

*To all whom it may concern:*

Be it known that I, THOMAS A. BANNING, Jr., a citizen of the United States, residing at Chicago, in the county of Cook and State of Illinois, have invented certain new and useful Improvements in Multiple-Punch Presses, of which the following is a specification.

This invention relates to a form of multiple punch press which is intended to perform punching operations in a metal or other sheet in conformity with a prescribed plan of punching as shown on a templet, which templet is prepared beforehand by punching holes in it in accordance with the arrangement of the holes desired in the final product.

There are many punching operations carried on in which large sheets of metal must be handled, whose total area is greater than the capacity of any machine which it would be practical to build. In order to punch the holes in such a sheet, the latter would have to be moved through the machine by sections, each section being properly punched whether the arrangement of holes in said section be the same as in another section or sections or not. In other words, in order to punch such a large sheet, the machine should be so constructed that it will automatically alter the position and number of the working dies for each stroke, in accordance with the manner in which the holes should be punched corresponding to that stroke. For example, if it were desirable to punch holes around the periphery of a long sheet of uniform width dies should be set up in the first stroke to punch holes across the end of the sheet and for a certain distance along each side; for the next stroke dies should be set up to punch holes along the sides only; then there might be a number of strokes similar to this previous one, and finally a stroke in which dies should be set up along the edges of the sheet and along its last end. In order to properly set up the dies for such a cycle of movements, the templet might be of either of two forms: It might comprise a single loop which, when the cycle had been completed, would have moved entirely around in position to start a new cycle, or it might comprise a portion of a long templet on which were punched a number of hole cycles all alike.

Objects of this invention are, to provide a machine which may automatically carry on the punching operations in the metal sheet in accordance with the arrangement of holes in a templet; to provide means for manually regulating the movements of the machine when desired, as, for example, in cases where it would not be safe to use a machine entirely automatic in its actions; to make use of air under compression as the medium for transmitting control movements from the templet to the punching dies; to provide a machine having a capacity great enough to punch transverse as well as longitudinal rows of holes; to provide means for enabling the use of only a portion of the machine when it is desired to punch narrow plates, thus effecting a saving in energy consumption and a saving of air and virtually providing one large machine comprised of a number of units, which, however, may be interlocked and made to operate as a single machine when desired; to provide means for punching the holes in accordance with any cycle of movements desired; to provide means for feeding the plate during each punching operation an amount corresponding to the capacity of the machine, or an amount corresponding to proper indications on the templet; to provide means for effecting a total amount of feeding during the cycle, corresponding to the length of plate which should be acted upon during that cycle and regardless of the total length of plate—in other words, to provide a machine which will automatically punch holes in the proper locations in a sheet of any length, and after having completed such an operation be ready to repeat it; to interlock the movements of the templet, the movements of the dies, and the movements of the plate in such a way that conflicting movements cannot occur, as, for example, attempting to move the plate while the punch head is performing a working stroke, and to provide such interlocking whether the machine be used as an entirely automatic machine or as a semi-automatic machine, or as a manually controlled machine; to provide means for insuring a positive control of the die movements regardless of the size of the machine—that is, regardless of the number of dies and the size of the press-head—and at the same time to insure that the minimum amount of air leakage shall occur; to provide means enabling a templet to be quickly removed and replaced by another one, either of the same length or of a different length; to provide a machine whose parts are arranged in such a manner as to be easily accessible for purposes of replacement or repair; to provide a machine of arrangement such as to permit parts to be replaced with a minimum of trouble and expense; to provide means for insuring a positive action of those punching dies which are intended to be used during each stroke; to provide means for adjusting the various parts with respect to each other, so as to obtain the most satisfactory operation under each set of conditions, and in other ways and manners to provide a machine of simple construction and yet one which shall be capable of performing all of the functions before stated, as well as others which will appear from time to time in this specification.

Other objects and uses will appear from a detailed description of the invention, which consists in the features of construction and combination of parts hereinafter described and claimed.

Referring to the drawings

In the embodiment of my invention I provide a stationary die member provided with a plurality of female dies and properly supported and adapted to carry the sheet of metal. Above this stationary die member I provide a movable punch head which can be raised and lowered to perform the punching operations. This movable punch head is provided in its lower portion with a plurality of die sockets, and die members which may retract into the sockets but which, when projected, register with the holes in the stationary die member.

In order to cause the proper dies to remain in working position during a working stroke, I provide means for preventing the retraction of these dies back into their sockets during that stroke. These means comprise pneumatic pistons, whose plungers may be forced out by compressed air into position to engage the dies after they have dropped into working position, so that thereafter they cannot be forced back into the sockets until the pistons have been withdrawn.

The templet may comprise a belt or strip of flexible material—for example, leather—properly punched with holes in relative positions, the same as those desired in the final product. On one side of this templet I provide one or more air chambers, each having on one side a series of bosses provided with holes communicating with the interior of the chamber and in position to register with holes in the templet. On the other side of the templet I support a plate, likewise provided with a plurality of perforated bosses in alinement with the bosses of the air chamber. Each perforation of the last mentioned plate is properly connected, as by a flexible air hose, with one of the pneumatic cylinders in the movable press-head, so that when a hole in the templet comes into line with one of the bosses on the air chamber, and likewise one of the bosses on the plate, air may pass from the chamber through the hole of the templet, through the perforated boss of the plate, and down through the air hose to the proper air cylinder, whose piston will thereupon be projected into position to prevent the retraction of the corresponding die within its socket. Then when the punching movement of the press-head takes place, this die will be held in working projected position so that it will punch a hole in the plate.

In order to unlock each and every die after each punching operation, I provide an air valve so connected and controlled that immediately after withdrawing or raising the punch head the air will be exhausted from the air chamber and therefore from all of the cylinders which might have been supplied with air during the previous stroke. After thus exhausting the air, and while the press-head is still in raised position, mechanisms are set in motion to advance the plate and templet a proper amount preparatory to performing the succeeding punching stroke. When the plate and templet have ceased their movement, the afore-mentioned air valve is operated to admit air into the air chamber, and again all die-control pistons will be projected corresponding to perforations in the templet which may be in line with the proper bosses of the air chamber and plate, at that time. Thereafter, while still maintaining air pressure in the chamber and proper air cylinders, the press-head is forced down to perform the punching operation, the parts being so interlocked that no attempt can be made to advance either the plate or the templet.

Referring now to the drawings, the lower die member is shown at 13 and is supported by means of legs 14, 15, 16 and 17 (17 not being shown). The movable die member is shown at 18, and it comprises a heavy casting of approximately rectangular shape 19, supported between uprights 20, 21, 22 and 23 (23 not being shown), which uprights may be in the form of continuations of the legs 14, 15, 16 and 17. Between the uprights 20 and 23 and 21 and 22, respectively, are provided cross-members 24 and 25, respectively, which carry actuating shafts 26 and 27, each being provided with a pair of eccentrics 28 and 29 for raising and lowering the press-head through the medium of a corresponding pair of links 30 and 31. At each end of each shaft is provided a gear 32, the pairs of gears at each end meshing with a driven gear 33, which may be driven in any suitable manner, as by means of a gear 34 meshing with the gear on a motor shaft.

Figure 5:
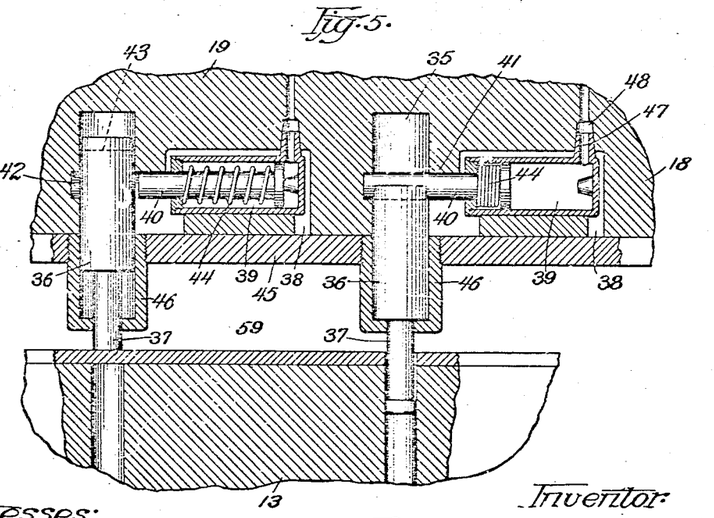
Fig. 5 is an enlarged detail in section of two die members, one of them being shown in working position and the other one in idle position.

Returning to the press-head, its lower surface is provided with a plurality of sockets 35, into each of which may retract the upper end 36 of a die 37. The lower surface of the press-head is likewise provided with a plurality of chambers 38, in proper communication with the chambers 35, and each adapted to carry a pneumatic cylinder 39 whose piston-rod 40 may be projected out across the chamber 35 in position to block a movement of the upper end 36 of the corresponding die. In order to provide a firm bearing for each of the piston rods 40, so that it will be able to withstand the heavy strains coming upon it in order to resist movements of the die member during the punching operation, I provide a wall 41 immediately above the path of the piston 40, and a pocket 42 in the opposite wall of the socket 35, into which pocket the piston will move and find a bearing. By this construction the piston is firmly supported on each side of the socket 35, so that the maximum strength will be available to resist movements of the die, inasmuch as the piston-rod will be in "double shear." Likewise, in order to secure a firm bearing of the portion 36 on the piston-rod, I cut the top of the former so as to present a semi-circular surface 43 (see Figs. 2 and 5), which surface will just receive the piston-rod 40. Each cylinder is provided with a spring 44, which tends to retract the piston so that when air pressure is relieved the former will be withdrawn from the socket 35 to permit retraction of the die member.

The lower surface of the press-head comprises a plate 45, properly secured to the casting 19 and provided with holes, each adapted to receive a cup 46, which will prevent the die member from falling out. By the provision of this construction, in which the pneumatic cylinders are carried in sockets 38 and in which the die members retract within the sockets 35, the various parts may be easily assembled or disassembled at any time, as it is only necessary to remove the plate 45, or a portion thereof, to get at the proper working parts. Each cylinder is provided with a tapered nib 47, which may be driven into a hole 48 of the casting 19, said hole passing through the casting to its upper surface (see Figs. 2 and 3).

The upper surface of the press-head comprises a plate 49, so secured to the casting 19 as to provide an open space 50 between the plate and casting. Each hole 48 has driven into its upper end a pipe connection 51, which passes out through the plate 49 and to whose projecting end is attached a flexible air connection or hose 52. My object in providing the pipe connectors 51 is as follows: Some of the die members—as, for example, 53—are located in difficult or inaccessible portions of the press-head, so that it would be difficult to carry an air hose back under the cross-member 25. By using a pipe such as 51, the connection may be carried a proper distance along in the space 50 and then brought out through the plate 49, where the air hose 54 may be conveniently attached.

Any suitable form of guideway may be used for the press-head, that illustrated comprising plates 55 and 56 bolted to each end of the casting and projecting beyond the edges of the casting in a manner to engage the uprights 21 and 22. Corresponding blocks of metal 57 and 58 may be bolted to the sides of the casting, likewise in position to engage the uprights, so as to provide guideways on the press-head and movable therewith.

Figure 2:
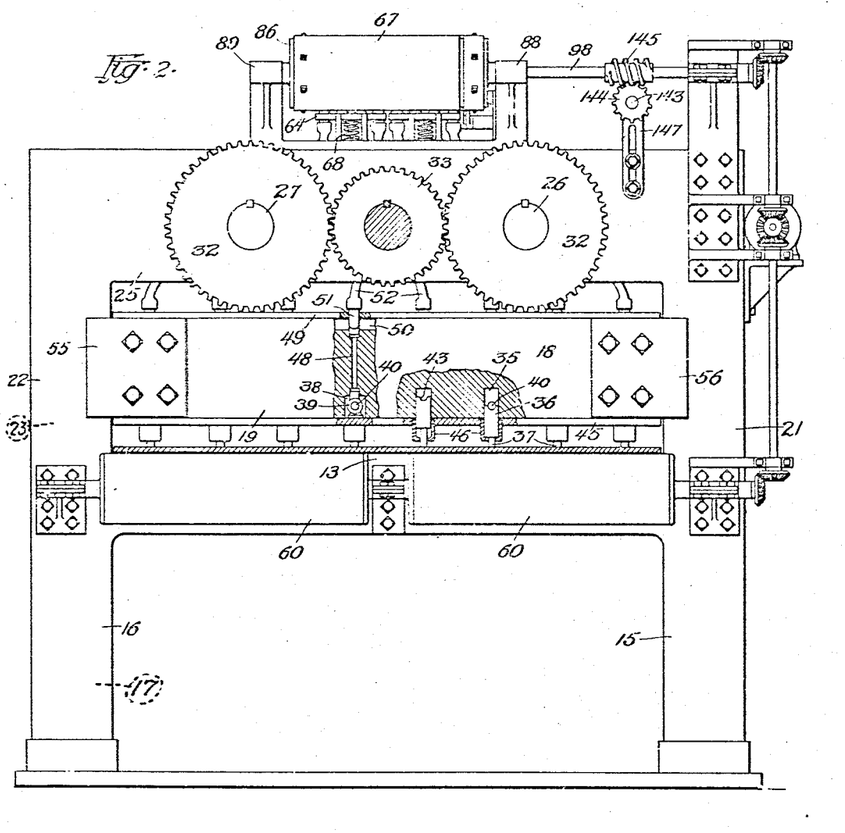
Fig. 2 is an end elevation of the machine of Fig. 1, portions of the press-head being cut away to show the construction of the movable dies.

The metal plate 59 rests on the top surface of the die member 13, but rollers 60 and 61 are properly positioned so that the ends of the plate will be carried by them and so that rotation of these rollers will advance the plate. If desired, each roller may be made of two or more sections, as best shown in Fig. 2.

Turning, now, to the construction of the air chamber and associated parts, these are best illustrated in Figs. 1, 2, 3 and 4. Each air chamber 62 is in the form of a hollow casting, provided on its lower face with a plurality of hollow bosses 63. Beneath each air chamber, or a portion thereof, is supported a plate 64, provided with hollow bosses 65 in position to register with the bosses of the air chamber. Each plate 64 is provided on its lower surface with lugs 66, to which may be attached the air hose 52 communicating to the cylinders. The templet 67 passes between the bosses 63 and 65, the bosses 65 of the plate 64 being held firmly but flexibly against the lower surface of the templet 67, as by means of springs 68, whose compression can be adjusted by means of bolts 69. In order to insure air-tight contact between the bosses and the templet, I provide each of the air chamber bosses with a gasket 70 and each of the plate bosses with a gasket 71. The latter gaskets may be of any shape, the preferred type being rectangular in section and set into a recess of the boss. Evidently the gaskets 70, being carried in the lower surface of the bosses 63, will tend to fall out when the templet is being changed. Therefore the preferred form of gasket in this location is one circular in section set within a circular recess of the bosses 63, said recess being countersunk so as to hold the gasket in position after once being forced into place.

The preferred manner of supporting the air chambers and plates is by means of a casting including cross-bars 72 and 73 extending between the cross-members 24 and 25, said casting also including cross members 74 and 75 placed transversely with respect to the templet. Evidently means must be provided for removing belt templets sidewise from between the air chambers and corresponding plates. To this end, the members 74 and 75 may be rigidly secured to the casting or may be integral with it at their ends 76 and 77, respectively, but their ends 78 and 79 must be supported in such a manner that a space may be provided for removing the templet. The preferred manner of supporting includes blocks of metal 80 beneath the ends 78 and 79, so that bolts or studs 81 may be passed through the ends of the cross-members 74 and 75, down through these blocks of metal, and into the members 73 beneath. By withdrawing the studs and metal blocks, a space will be provided through which the templet may be slid. At the same time, the air chambers will be rigidly carried when in use. Evidently the only strains coming upon the members 74 and 75 when removing a templet will be those due to the combined weights of the several parts, whereas when in use an additional or supplemental strain will be introduced in the form of a compression of the springs 68. Each air chamber is provided at one end with lugs 82, which rest upon the cross member 75 and may be bolted thereto. The other end of each air chamber is provided with an air pipe 83, which pipes may sit within sockets in the cross member 74, being retained in position by means of a cover 84. Tap bolts 85 serve to close holes in the opposite ends of the air chambers, which holes will facilitate their cleaning from time to time.

The templet, as before stated, may be in the form of a closed belt or a continuous open strip of proper material. The closed belt form is illustrated as being the most suitable under ordinary circumstances. This templet 67 passes over rollers 86 and 87 at the front and rear ends of the machine respectively. The roller 86 is provided with a shaft 87$^a$, which seats within slotted bearings 88 and 89 properly carried by the frame of the machine. The slots of these bearings should slant in such a direction that tension on the templet will tend to hold the shaft down, thus preventing it from working out in use. The roller 87 is provided with a shaft 90, which likewise sits within bearings 91 and 92, likewise slotted but in a direction opposite to that of the bearings 88 and 89. Each of the bearings 91 and 92 is movably carried in a lug 93 or 94, so that it may be moved back and forth, thus carrying the roller 87 back and forth in order to properly adjust the distance between the rollers 86 and 87 corresponding to the length of belt being used. In order to hold the bearings 91 and 92 in proper position, use may be made of tap bolts 95 and 96.

A motor 97 may be used to drive the rolls 60 and 61, which advance the plate, and the roller 86, which advances the belt 67. The shaft 98, which drives the belt roller, may be keyed to the shaft 87$^a$ as at 99, so that the roller 86 and shaft 87$^a$ can be lifted out from the bearings 88 and 89 in order to change the templet without disturbing the shaft 98.

Figure 6:
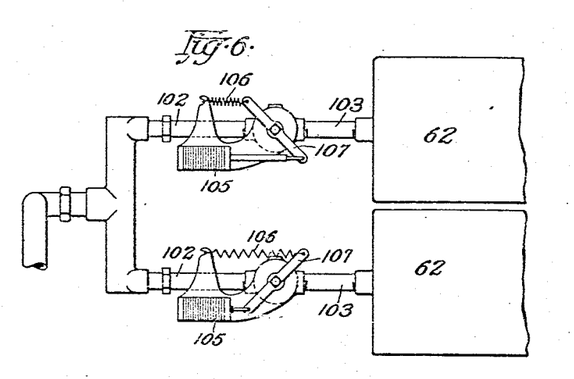
Fig. 6 is an enlarged detail of one form of air valve, showing it as applied to a construction in which the air chambers are fed independently with air from a main supply source, as would be the case when operating the machine split into a number of sections.
Figure 7:
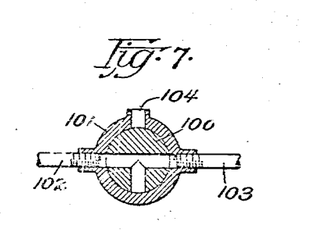
Fig. 7 is a detail section of the air valve of Fig. 6.

The preferred form of valve for controlling the air in the air chambers is shown in Figs. 6 and 7. It comprises a three-way plug 100 and a body portion 101 so arranged that when the plug is thrown in the position of Fig. 7 air may pass directly from a pipe 102 to a pipe 103 which leads into the air chamber, and so that when the plug is rotated through 90° the pipe 102 will be entirely closed but air can discharge from the pipe 103 to atmosphere at 104. In order to control the movements of this valve, I provide a solenoid 105 and a spring 106, which act in opposition on a lever 107 which is directly connected to the plug. The parts should preferably be arranged so that current passing through the solenoid will pull the lever against the tension of the spring into the position which allows air to pass from the pipe 102 into the chamber, and so that when current is released from the solenoid the spring will return the plug into the position which cuts off the supply of air and exhausts the air from the chamber.

Figure 8:
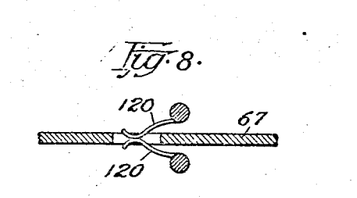
Fig. 8 is a detail section of a portion of the templet, showing one of the electrical control slots and contacts for working through such slots.

Referring now to the diagrams shown in Figs. 9, 10, 11 and 12, I will explain the manner in which the several parts may be made to operate either entirely automatically or semi-automatically or manually, and I will explain the manner in which the device may be used for advancing the plate different lengths, corresponding to different strokes, but controlled by the markings in the templet. In each figure the templet is designated 108 and the punchings used to permit the flow of air into the different feed pipes are omitted for the sake of simplicity. A source of electric power is shown at 109. In order to start and stop the templet and the rolls which control the movements of the plate, the motor 97 may be started and stopped for each successive movement, or the motor may be allowed to run continuously and a clutch be used for alternately connecting and disconnecting the motor from the templet shaft and from the shaft which drives the feed rolls. The numeral 110 designates a motor or a clutch, depending upon which mode of transmission is used. In like manner the press-head may be raised and lowered for each stroke by starting and stopping the motor or by allowing the motor to run continuously and making use of a clutch. Therefore the numeral 111 designates either the motor or the clutch which controls the movements of the press-head. A commutator 112 is connected to the mechanisms in such a way that it will make one complete revolution for each complete stroke of the press-head, and a commutator 113 is connected to the shafts which control the movements of the templet and of the plate in a manner to be hereinafter described. The commutator 112 comprises an insulating block carrying in its periphery one or more contacts 114 and 115, which may come into engagement with brushes 116 and 117, respectively. It will be understood that these contacts are axially displaced in the commutator in such manner that the brush 116 can only engage the contact 114 and the brush 117 can only engage the contact 115. A series of "feed control" slots 118 and a series of press-feed slots 119 are provided in the templet when the machine is to operate in an automatic manner. These slots are so arranged that brushes 120, as in Fig. 8, may come together to close the electrical circuits when the slots are in the proper positions, but so that when the slots move away from the brushes the latter will be forced apart, thus breaking the circuit. The air controlled solenoid 105 is shown as related to the other principal parts of the circuit. The commutator 113 also comprises an insulating block provided in its periphery with one or more contacts 121, against which may bear a brush 122 to close an electrical circuit.

Figure 9:
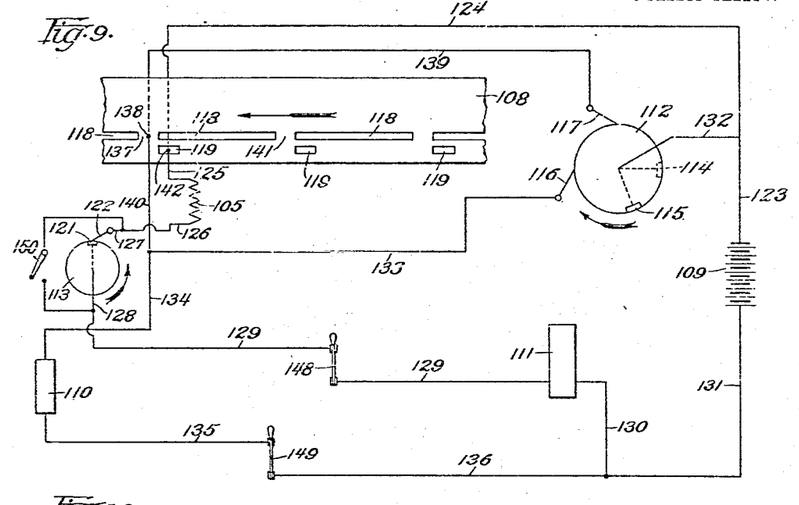
Fig. 9 is an electrical diagram showing in outline the circuits preferred when using the machine in an entirely automatic manner.

In Fig. 9 the parts are shown in the relation which they would bear to each other while the press-head was being operated. In this case current may pass up through wires 123 and 124 to one of the brushes of a slot 119, and thence through another wire 125 and through the solenoid 105 and connections 126 and 127 to the brush 122. It will be understood that while the press-head is operating the templet and plate are at rest. In this case the commutator 113 will also be at rest in a position so that the brush 122 will bear against the contact 121. Current will then flow down through the connections 128 and 129, through the motor or clutch 111 and connections 130 and 131, back to the source of current. Thus the press-head will be operated when the templet and feed plate are at rest.

Shortly before the press-head completes its up-stroke, but after the dies have disengaged from the metal plate, the contact 114 will wipe against the brush 116, thus throwing a charge of current through the connections 132, 133 and 134 and motor or clutch 110 and connections 135, 136 and 131, back to the source of current. This momentary contact existing between the parts 114 and 116 will serve to start the templet on its movement so that the bridge 137 between two consecutive slots 118 will be moved out of the way, thus permitting brush 138 to fall together, comprising an electrical circuit through the connections 139, 140 and 134 to the motor or clutch 110. By the time that this circuit has been completed, the contact 114 will have moved past the brush 116 and the contact 115 will have come into engagement with the brush 117, so that a supply of electric current will be fed to the clutch or motor 110 through the brushes which are in engagement through the slot 118. The motor or clutch 110 will thereafter continue to drive the templet and metal plate forward until the bridge 141 slides in between the brushes and opens the circuit. By the time that this has happened, the contact 121 on the commutator 113 will have come into engagement with the brush 122, and the brushes 142 will have come together in the slot 119, so that an electrical circuit will be completed through the motor or clutch 111, which will thereupon start to operate the press-head to perform a new cycle. In this manner all of the operations may be made entirely automatic and may be interlocked so that the templet and plate will be moved forward a proper amount corresponding to the length of the slot 118, and as soon as their movement has completed the press-head will start its movements. When the press-head has completed its operation, the templet and plate will again be advanced to perform a new cycle.

Figure 1:
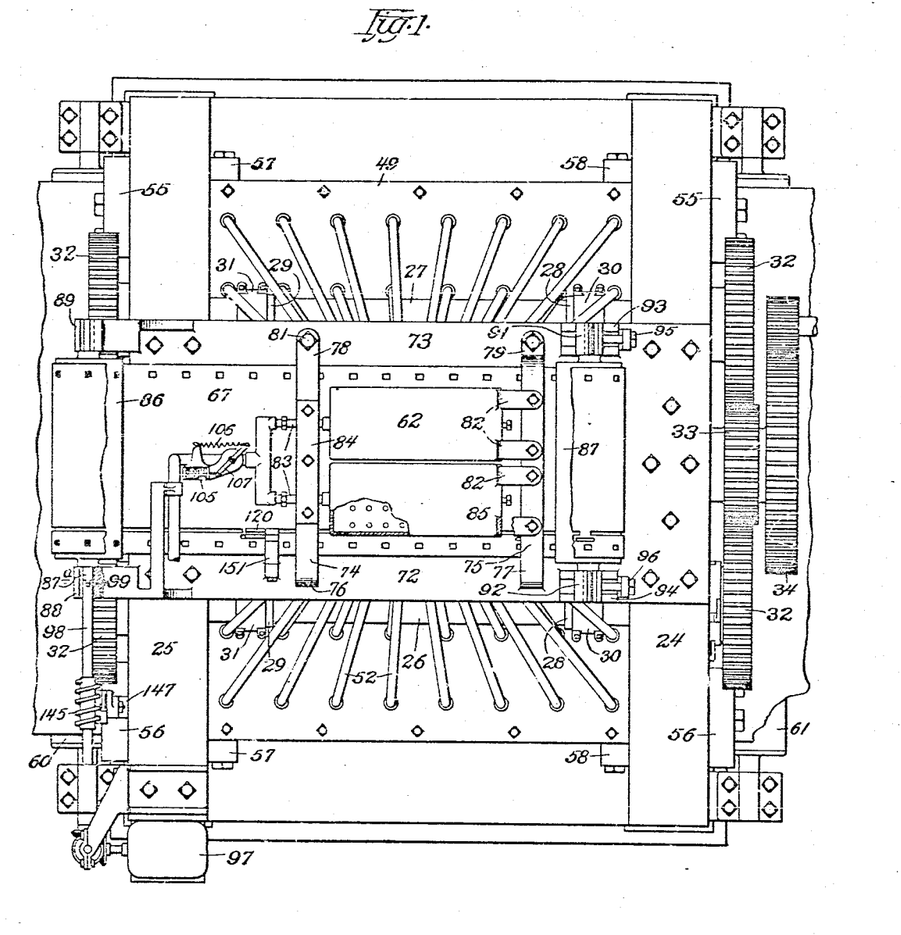
—Figure 1 shows a plan view of one of my multiple punch presses making use of a templet of closed band type, the upper portion of the templet being cut away so as to reveal the air chambers beneath, and a portion of one air chamber being cut away so as to show its interior, the machine illustrated being of the automatic type but not being shown as provided with means for splitting it into two or more sections which may operate semi-independently of each other.

Referring to Figs. 1 and 2, the commutator 113 is mounted on a shaft 143, which carries a worm gear 144, and a worm 145 on the shaft 98 drives the gear 144 so that the commutator 113 makes exactly one revolution while the templet is advanced a length corresponding to the slots 118. In other words, all of the slots 118 must be of equal length with the arrangement shown, which means that the templet and plate must always advance the same amount.

Figure 12:
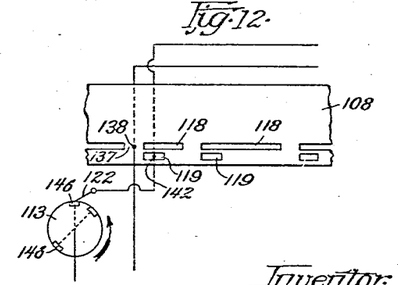
Fig. 12 is a diagram showing the manner in which the machine may be made to automatically feed different lengths of plate and templet preparatory to different strokes of the machine.

In order to provide an arrangement wherein the templet and plate may be advanced different amounts, corresponding to different strokes, I provide the following arrangement. Referring to Fig. 12, the slots 118 are seen to be of different lengths, but corresponding to each of these slots is a slot 119 which interlocks the movements of the press-head with the movements of the templet and plate. The commutator 113 in this case is of such diameter, and is driven by the worm 145 and gear 144 in such manner, that the commutator makes one revolution after the press-head has operated a number of times. That is to say, that several strokes of the press-head and corresponding movements of the templet and plate occur while the commutator 113 makes one revolution. A number of contacts 146 are provided on this commutator and spaced from each other distances corresponding to the lengths of the slots 118, so that at the instant the brushes 138 are separated by a bridge 137 the proper contact 146 will bridge the brush 122 and the brushes 142 will come into engagement through the slot 119 to start the power which operates the press-head. If, for example, there were four movements of the templet and plate, of different lengths, succeeding each other, then there would be four contacts on the commutator 113, so that the latter would make one revolution during the time consumed in four movements of the press-head, and then the commutator and the slots 118 would be in position to repeat the cycle.

In order to provide for the use of different diameters of commutator 113, and in order to provide some flexibility in the coupling of the worm 145 and the gear 144, the commutator and gear may be mounted on the bracket 147, which can be raised and lowered with respect to the frame of the machine, corresponding to different diameters of the gear.

In order to permit of a certain amount of manual control, even when using the automatic connections, switches 148 and 149 may be placed in the press-head circuit and in the feed circuit respectively. These will permit of stopping the mechanism at any instant should occasion arise.

It will be noted that two means are provided for opening the press-head circuit under normal conditions. These comprise the slots 119 and the commutator 113. In other words, the circuit will be broken at both of these points together when the press-head should not move. Obviously, the commutator 113 may be short-circuited when desired, as by means of a switch 150, in which case the only means remaining for opening the press-head circuit, and thus stopping the movements of the press-head, will be the slots 119 in the templet. Also it is seen that by placing the air-controlled solenoid 105 in the circuit which includes the press-head operations, this solenoid, and therefore the air valve, will be properly operated in conformity to the movements of the rest of the apparatus. In other words, the air valve will be opened to permit air to enter the chambers during the entire movement of the press-head, after which the solenoid will be deënergized, thus exhausting the air from the chamber as is desired.

Figure 10:
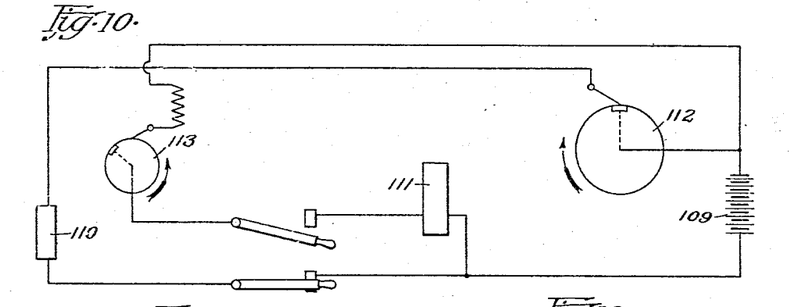
Fig. 10 is an electrical diagram showing connections which might be used for manual control.

In Fig. 10 I show connections for a manual control of the parts, but means are provided for interlocking the press-head movements with the feeding movements so that the two cannot occur simultaneously. That is to say, while the feeding operation takes place during which the templet and plate are advanced, the press-head cannot move, because the contact on the commutator 113 does not complete a circuit through its brush.

As has been above stated, it is desirable to be able to use this machine as a split machine, in which case it virtually operates as two units brought together within one frame. In this case, a narrow templet may be provided for each of the air chambers, each templet being of a width corresponding to that chamber. In this case, also, each templet would be provided with the slots necessary for performing the proper movements of the rest of the mechanism, including the turning on and off of air by the air valves.

Another method of operation might be used, which would be the use of a wide templet properly punched or arranged to operate the air valves of the several chambers in proper relation to each other. Such a scheme is shown diagrammatically in Fig. 11. In this case two sets of slots 119 are provided, one at each side of the belt, and two solenoids 105 may be operated by the contacts which work in the two sets of slots 119. These two solenoids are connected together in shunt between the wires 124 and 126, so that whenever the press-head circuit is completed in the rest of its parts it will include either or both of the solenoids 105, according to whether slots 119 register with the brushes connected to both of these solenoids. In the diagram 11 there are shown two slots, in positions to close both of the circuits, while in the next location there is shown a slot for closing the circuit of the right-hand solenoid, but not for closing that of the left-hand solenoid. This would correspond to a condition where the air chamber corresponding to the lower half of the templet was to be operated at the next movement, but where the air chamber corresponding to the upper half of the templet was not to be operated.

Obviously the simplest way of providing a positive drive for the templet is to perforate the same near its edges, so that teeth on the drive-roll 86 will engage these perforations to advance the templet. This is the preferred construction, for it is very desirable that the templet move exactly the right amount for each operation.

Figure 3:
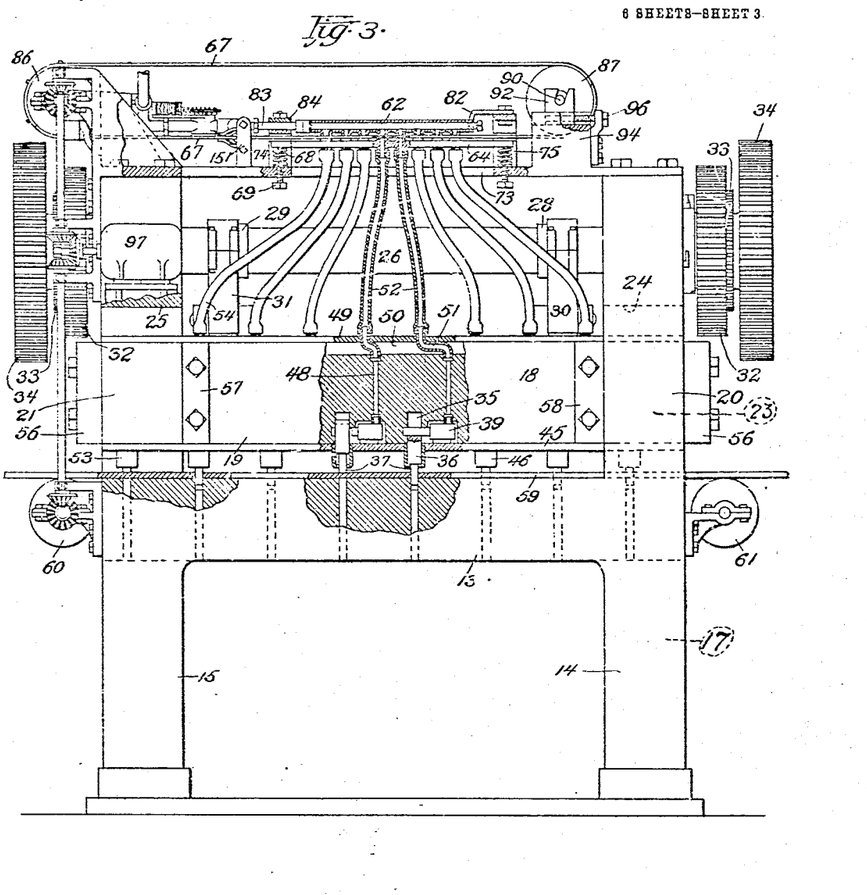
Fig. 3 is a side elevation of the machine of Fig. 1, portions of the press-head and lower die plate being cut away to show the dies and the air chamber and adjacent parts being shown in section so as to show the manner in which air will pass from the chamber down through holes in the templet into the proper cylinder feed pipes.
Figure 4:
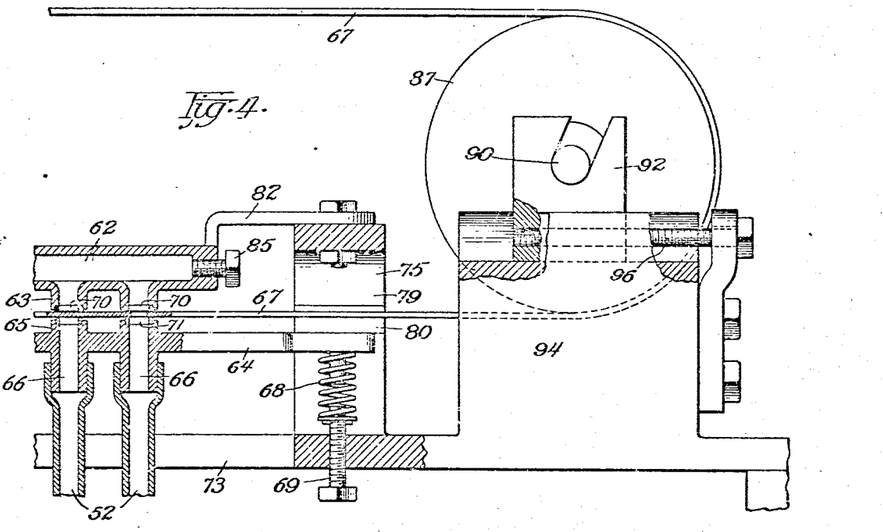
Fig. 4 is an enlarged detail of the idler end of a closed band templet and adjacent parts in section, showing the manner in which air leakage at the templet is prevented.

In Figs. 1, 2 and 3 the various sets of brushes which complete the circuits through the slots are shown as carried by a bracket 151. This should preferably be on the side of the templet opposite to that from which the latter is withdrawn, so as not to interfere with its insertion and replacement.

Figure 11:
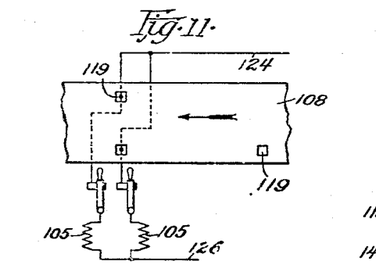
Fig. 11 is a detail of a portion of the diagram of Fig. 9, showing how the latter may be modified when it is desired to use the machine as a split machine.

Although I have shown the use of mechanisms for permitting the templet and plate to be moved different distances, as associated with mechanisms which do not permit the machine to be split, and thus make use of only one of the air chambers at a time, still it is evident that the devices of Figs. 11 and 12 may be used in the same combination, or, in fact, that any of the different features herein shown and described may be used with any of the other features with which they do not conflict.

I claim:

1. In a multiple punch press, the combination of a movable press-head having in its lower face a plurality of retractable die members and a pneumatic piston for each die member adapted when extended to retain the die member in working projected position, a perforated templet and an air chamber adjacent thereto and adapted to deliver compressed air through the perforations of the templet to the die members whereby the die members are held in operative position in accordance with the perforations of the templet, substantially as described.

2. In a multiple punch press, the combination of a movable press-head having in its lower face a plurality of retractable die members and a plurality of pneumatic pistons adjacent the die members and adapted when extended to retain the die members in projected position, a perforated templet and a hollow air chamber having on one face a plurality of bosses adjacent the templet and a plate adjacent the other side of the templet and having a plurality of bosses in corresponding position to those of the air chamber, said last named bosses being pneumatically connected to the pistons in a manner whereby air may flow from the air chamber through the perforations of the templet, and connections to the pistons to retain the latter in projected position in accordance with the perforations of the templet, substantially as described.

3. In a multiple punch press, the combination of a movable press-head having in its lower face a plurality of retractable die members and a perforated templet and means for retaining the retractable die members in extended position in accordance with the perforations of the templet, means for advancing the templet and the plate, and means for operating the press-head, and means for interlocking the movements of the templet and the plate and the press-head, substantially as described.

4. In a multiple punch press, the combination of a movable press-head, a plurality of movable die members therein and a perforated and slotted templet, and pneumatically controlled means for retaining the movable die members in accordance with the perforations of the templet, and means for feeding the templet and plate in accordance with the slots on the templet, substantially as described.

5. In a multiple punch press, the combination of a movable press-head, a plurality of movable die members therein, a perforated and slotted templet, means for moving the press-head and means for feeding the templet and plate in accordance with the slots of the templet, and means for interlocking said feeding means with the movements of the press-head, substantially as described.

6. In a multiple punch press, the combination of a movable press-head having in its lower face a plurality of retractable die members and a pneumatic piston for retaining each die member in operative position, a perforated templet and a plurality of hollow air chambers adjacent the templet, each air chamber being provided with a plurality of hollow air bosses adjacent the templet and a plurality of plates adjacent the other side of the templet and provided with a plurality of hollow air bosses in line with the bosses of the air chamber, each of the air bosses of the plate being pneumatically connected with a piston, and flexible means for retaining each plate in frictional contact with the templet whereby the templet will be gripped in an air-tight manner between the bosses of the air chambers and the bosses of the plates, and means for controlling the flow of air to and from the air chambers, means for feeding the templet and plate, and means for moving the press-head, substantially as described.

7. In a multiple punch press, the combination of a movable press-head having in its lower face a plurality of retractable die members and a pneumatic piston for each die member adapted when extended to retain the die member in projected position, a perforated templet and a plurality of hollow air chambers each provided on one side with a plurality of hollow air bosses in frictional contact with the templet, and a plurality of flexibly supported plates each provided with a plurality of hollow air bosses in frictional contact with the other side of the templet and in line with the bosses of the air chambers, the hollow bosses of the plates being pneumatically connected to the air pistons, means for feeding the templet and plates and means for raising and lowering the press-head, and means for controlling the flow of air to and from the air chambers in accordance with the movements of the press-head whereby when the press-head is in motion air will be admitted to the air chambers and whereby when the press-head is at rest the air will be exhausted from the chambers, substantially as described.

8. In a multiple punch press, the combination of a movable press-head having in its lower face a plurality of retractable die members and a pneumatic piston adjacent each die member and adapted when in extended position to retain the die member in projected working position, a perforated and slotted templet and a plurality of hollow air chambers adjacent the templet and each provided with a plurality of hollow bosses in frictional contact with one side of the templet, and a plurality of flexibly supported plates adjacent the other side of the templet and each provided with a plurality of hollow bosses in frictional contact therewith, said last named bosses being in line with the bosses of the hollow air chambers and being each pneumatically connected to one of the aforesaid pistons, means for feeding the templet and plate in accordance with the slots of the templet and means for raising and lowering the press-head, and means for controlling the admission of air to and from the air chambers in accordance with slots of the templet and in accordance with the movements of the press-head, substantially as described.

9. In a multiple punch press, the combination of a movable press-head having in its lower face a plurality of retractable die members and a pneumatic piston adjacent each die member and adapted when extended to retain the die member in projected working position, a perforated and slotted templet and a plurality of hollow air chambers adjacent thereto, each air chamber being provided on one side with a plurality of hollow bosses in frictional contact with the templet and a plurality of plates on the other side of the templet, each provided with a plurality of hollow air bosses in frictional contact with the other side of the templet and in line with the bosses of the air chambers, each of the bosses of the plates being pneumatically connected to one of the pistons, means for raising and lowering the press-head and means for feeding the templet and plate in accordance with slots of the templet, and means for controlling the flow of air to and from the air chambers in accordance with slots of the templet and in accordance with the movements of the press-head in a manner whereby when there is a perforation of the templet in line with one of the bosses of the air chamber air will be admitted to that chamber during the working stroke of the press-head, substantially as described.

10. In a multiple punch press, the combination of a movable press-head having in its lower face a plurality of retractable die members and a pneumatic piston adjacent each die member and adapted when extended to retain the die member in projected working position, a perforated and slotted templet and a hollow air chamber adjacent thereto and provided on one face with a plurality of hollow air bosses in frictional contact with one side of the templet and a plate adjacent the other side of the templet and provided with a plurality of hollow air bosses in line with the bosses of the air chamber and each pneumatically connected to a piston of the press-head, means for feeding the templet and plates distances proportioned to the lengths of slots in the templet, and means for raising and lowering the press-head, substantially as described.

THOMAS A. BANNING, Jr.

Witnesses:
FRANCES M. FROST,
WM. P. BOND.